United States Patent [19]

Rogers

[11] Patent Number: 4,640,482

[45] Date of Patent: Feb. 3, 1987

[54] FOLDABLE TRIPOD

[75] Inventor: Howard G. Rogers, Weston, Mass.

[73] Assignee: Polaroid Corporation, Cambridge, Mass.

[21] Appl. No.: 653,901

[22] Filed: Sep. 25, 1984

[51] Int. Cl.[4] .......................................... F16M 11/38
[52] U.S. Cl. ................................. 248/168; 248/188; 248/188.9; 248/DIG. 11; 403/113
[58] Field of Search ............... 248/168, 169, 170, 171, 248/166, 163.1, 188, 188.6, 188.8, 160, 439, 288.5, 188.9, 677, 188.7, DIG. 11, DIG. 12, 558; 403/113, 84, 73; 16/18 R, 19, 32, 45

[56] References Cited

U.S. PATENT DOCUMENTS

| | | | |
|---|---|---|---|
| 315,680 | 4/1885 | Vandenburgh | 248/168 |
| 434,307 | 8/1890 | Walker | 248/188.9 |
| 870,429 | 11/1907 | Grimler | 248/160 |
| 1,479,765 | 1/1924 | Whiting | 248/168 |
| 1,780,039 | 10/1930 | Pechan | 248/188 |
| 2,612,335 | 9/1952 | Saltzman | 248/188.9 |
| 2,691,501 | 10/1954 | Spencer | 248/168 |
| 3,870,264 | 3/1975 | Robinson | 248/171 |

FOREIGN PATENT DOCUMENTS

| | | | |
|---|---|---|---|
| 28890 | 6/1907 | Fed. Rep. of Germany | 16/32 |
| 2366509 | 6/1978 | France | 248/168 |
| 2378232 | 9/1978 | France | 248/168 |
| 37192 | 12/1936 | Netherlands | 248/188 |
| 1032942 | 6/1966 | United Kingdom | 403/84 |

*Primary Examiner*—J. Franklin Foss
*Assistant Examiner*—Robert A. Olson
*Attorney, Agent, or Firm*—Karl Hormann

[57] ABSTRACT

A folding tripod the legs of which are moveable into operative positions where they can be arrested to impart stability and firmness to the tripod, by clamping them against peripheral surfaces of brackets protruding from a center post of the tripod. Each bracket is provided with a bearing acting as a fulcrum for its associated leg, and with a peripheral surface surrounding the bearing, the surface having at least one portion which is closer to the bearing than other portions, whereby the legs tend to resist pivotal movement from an operative, load bearing position while permitting movement in an opposite direction to facilitate their release and subsequent storage.

16 Claims, 9 Drawing Figures

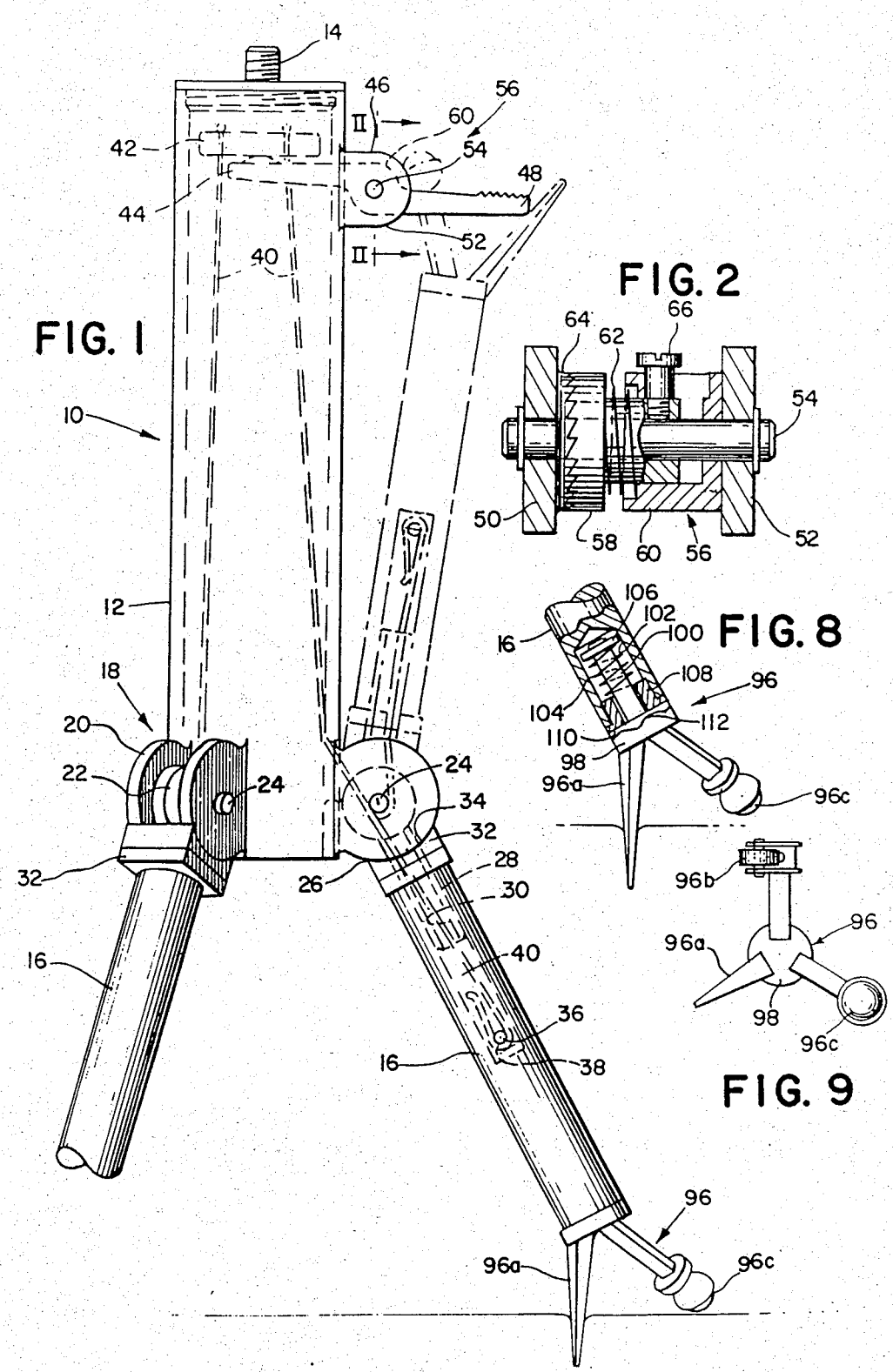

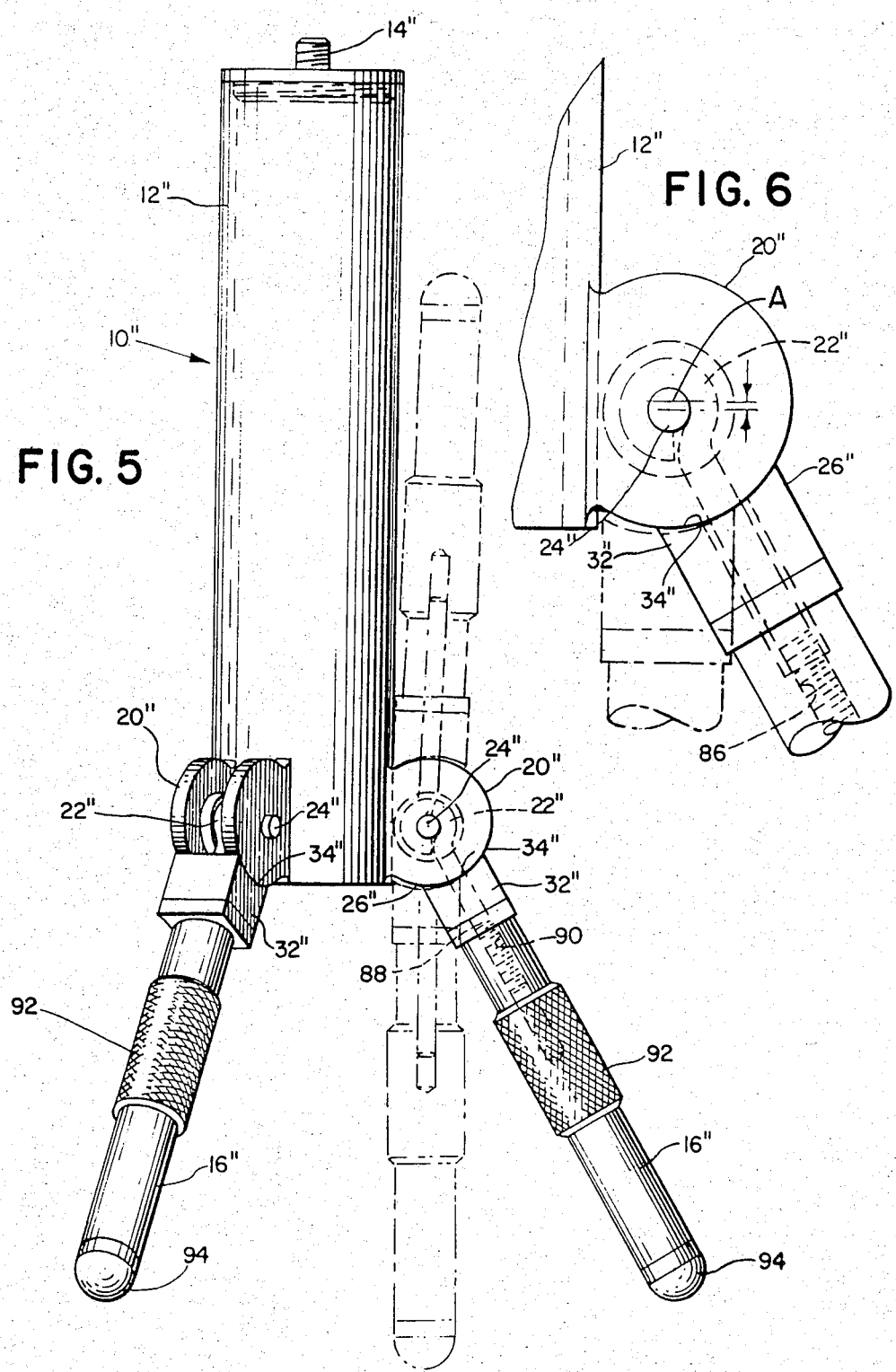

FOLDABLE TRIPOD

SUMMARY OF THE INVENTION

The present invention relates to multi-legged support means for optical instruments; more particularly the invention relates to novel foldable tripods.

Tripods are well known. They have been used for supporting optical instruments such as photographic cameras, theodolites, telescopes, and the like. They comprise three legs, usually pivotably mounted on a common support or pedestal for movement between an inoperative position in which they extend in generally parallel relationship with respect to each other, and an operative position in which they flare angularly away from the support. The extent to which the legs may be flared out usually depends on the angle between abutment shoulders formed on the pedestal and on the legs, respectively. Sometimes, with a view to lending increased rigidity to the tripod in its operative position, braces are provided which interconnect the legs and which may unfold as the legs moved into their operative position. It is commonplace to provide extensible legs for heightwise adjustability of tripods. The pedestal may be provided with a fixture, usually in the form of a threaded bolt or a clamping device, to which an instrument may releasably be attached. The fixture may be mounted on the pedestal by a rack and pinion or similar mechanism to allow for precise heightwise calibration of an instrument to be supported. The fixture may additionally be attached to a gimbal or other universal joint mechanism mounted on the tripod to permit angular adjustability of the instrument in any plane of movement.

While the art has been replete with tripods, none appear to have been known to be provided with simple and effective means which on the one hand allow securely to arrest the legs in their operative position and, on the other, permit quickly to release the legs for movability to their inoperative position.

It is, therefore, an object of the invention to provide an improved foldable tripod of simple construction.

Another object of the invention resides in the provision of a foldable tripod the legs of which may be securely arrested in an operative position in a simple manner.

Moreover, it is an object of this invention to provide a foldable tripod the legs of which become increasingly secure in their operative position as the weight of the load borne by the tripod increases.

A still further object of the invention rests in the provision of a tripod the legs of which may be securely arrested in operative positions with different angular orientations for each leg.

It is also an object of the invention to provide a tripod which is useful as an equatorial mount for a telescope. Furthermore, it is an object of the invention to provide a tripod suited for mounting an altazimuth.

Yet another object of the invention comprises the provision of means permitting quick and easy release of the legs from their operative position for moveability into their inoperative position.

Other objects will in part be obvious and will in part appear hereinafter.

In the accomplishment of these and other objects the invention, in a preferred embodiment, comprises a support member provided adjacent one of its ends with a plurality of brackets each comprising a bearing with an axis extending substantially normal to the longitudinal axis of the support member and a peripheral surface eccentrically surrounding each bearing in such a manner that at least one surface portion is closer to the axis of the bearing than other portions of the surface. Each bearing supports a leg member for pivotal movement between inoperative and operative positions, and each leg is provided with an abutment surface facing its respective peripheral bracket surface and is radially moveable relative thereto. Means is also provided for releasably locking each abutment surface into engagement with its associated peripheral bracket surface, the configuration of the abutment and peripheral bracket surfaces serving to prevent pivotal movement of the leg members in at least one direction.

DESCRIPTION OF THE DRAWINGS

The novel features of the invention are set forth with particularity in the appended claims. The invention itself, however, in respect of its organization, construction, and method of operation, as well as other objects and advantages, will be best understood from the following description and accompanying drawings in which:

FIG. 1 is a side elevational view of a tripod in accordance with the invention;

FIG. 2 is a sectional view along lines II—II of FIG. 1;

FIG. 5 is a side view of another embodiment of the invention;

FIG. 6 is a detailed view of the suspension of a leg on the tripod of FIG. 5;

FIG. 8 is a side view partially in section, of a preferred foot for use in connection with a tripod in accordance with the invention; and FIG. 9 is a top view of the foot shown in FIG. 8.

DESCRIPTION OF THE DRAWINGS

Figure 3:
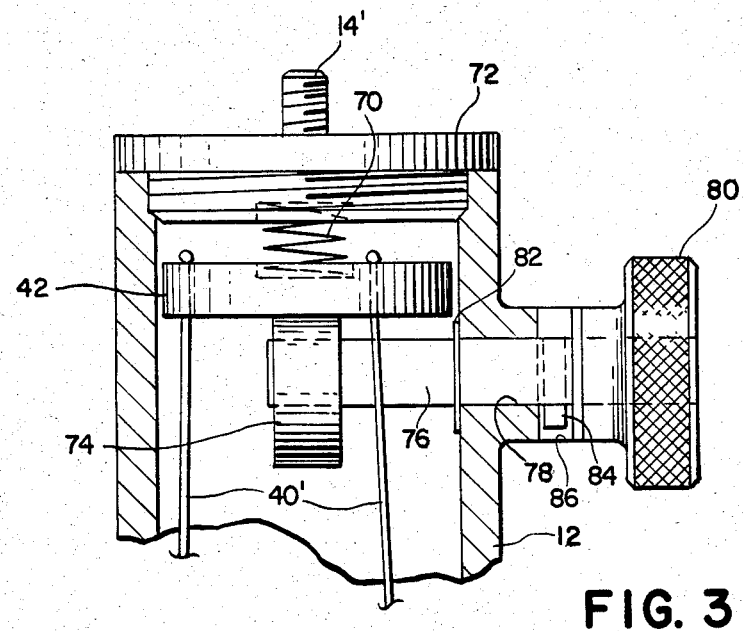
FIG. 3 side view, partially in section, on an enlarged scale of an alternate mechanism for arresting the legs of a tripod in accordance with the invention, in the operative position.

As may be seen in FIG. 1, a tripod 10 in accordance with one embodiment of the invention consists of a tubular support member or pedestal 12 provided at its upper end with a fixture 14 for releasably attaching an optical instrument such as a camera, theodolite, telescope, etc., (not shown.). While as presented in the drawing, the fixture comprises a threaded stud 14, other more elaborate devices such as gimbals, may also be used. At its other end the pedestal 12 is provided with three legs 16, one of which may be seen completely and another one in part, the third one having been omitted for clarity. The legs 16 may be attached to the pedestal 12 at equal spacing from each other for folding or pivotal movement between an operative position depicted in solid lines and an inoperative position shown in phantom. The connection of the leg 16 (as the arrangement is the same for each leg only one will be described) to the pedestal 12 is accomplished by a bracket or hinge 18 comprising a plurality of knuckles 20 radially protruding from the tubular pedestal 12 and complementing knuckles 22 shown axially to extend from the leg 16 and connected to the knuckles 20 by a pintle 24. The pintle 24 is received and properly secured in coaxially aligned bores provided in the knuckles 20 and 22.

The knuckles 20 have an arcuate and preferably a substantially circular contour facing away from the pedestal 12. The bore in which the pintle 24 is seated to provide a bearing for the leg 16 is located eccentrically with respect to the periphery of the knuckles 20. As shown in connection with the right leg 16 in FIG. 6, the bearing axis is radially offset from the true center A of the peripheral surface of the knuckles 20, at a position below the center A on a line intersecting the center A and extending in parallel to the longitudinal axis of the pedestal 12. Other positions for the bearing axis may be possible as well. Thus, the circumferential or peripheral surface constituting the contour of the knuckles 20 is positioned with respect to the pintle 24 and, hence, to the fulcrum of the leg 16, in such a manner that one arcuate portion 26 of the peripheral surface is radially closer to the pintle 24 than other portions. As will appear below, the eccentric position of the pintle 24 with respect to the peripheral surface is an important aspect of the invention. It permits securely to arrest the leg 16 in its operative load bearing position while allowing an easy release therefrom in the manner to be described.

The knuckles 22 extending from the leg 16 are an integral part of a tubular shaft 28 slideably seated in an axial recess 30 of the leg 16 and extending through a collar 32. The shaft 28 is provided with apertures at its end recessed in the leg 16 as well as at its end adjacent the knuckles 22. The collar 32 may be integral with the leg 16 and has a shoulder 34 the shape of which complements the contour of the knuckles 20. That is to say, the shoulder 34 in the embodiment shown has a circular contour with a radius equal to that of the peripheral surface of the knuckles 20. As will be understood by those skilled in the art, shoulder 34 may, however, have a different, e.g. planar configuration. As shown in FIG. 1 in solid lines and, with more detail, in FIG. 6, the shoulder 34 is aligned in parallel with respect to the peripheral surface of the knuckles 20 when the leg 16 is disposed at a predetermined acute angle relative to the longitudinal axis of the pedestal 12. This angular disposition of the leg 16 represents its optimum operative or load bearing position. As will be described in detail below, the leg 16 is mounted for radial movement relative to the knuckles 20, and the shoulder 34 may be pressed into engagement with the peripheral surface of the knuckles 20. Owing to the increasing radius between the pintle 24 and the peripheral surface of the knuckles 20 in an outward direction, any weight placed on the pedestal 12 would lead to an increased damping engagement between shoulder 34 and peripheral surface further and thus lock the leg 16 in its operative position. On the other hand, the decreasing radial distance between the pintle 24 and the knuckle surface in the opposite, inward direction would permit pivoting the leg 16 inwardly under its own weight as when the tripod 10 is lifted, thus lifting the shoulder 34 off the peripheral surface as shown in phantom in FIG. 5 to the left of the right leg.

An axial bore in the collar 32 permits relative axial sliding motion between the collar 32 and the shaft 28. This, in combination with the eccentrically placed fulcrum or pintle 24 forms another important aspect of the invention and will be described in greater detail below.

Extending through the tubular shaft 28 and anchored by a hook 38 to a pin 36 secured within the leg 16, is a cable 40. The cable 40 leads through an aperture in the wall of the pedestal 12 and is attached, at its other end, to a rigid plate 42. The plate 42 is mounted for vertical movement within the pedestal 12 and is supported therein by one arm 44 of a two-armed lever 46. The other arm 48 of the two-armed lever 46 protrudes radially from the pedestal 12. Brackets 50 and 52 are provided with axially aligned bores in which a pin 54 is received. The pin 54 serves pivotably to support the two-armed lever 46.

The two-armed lever 46 is part of a conventional one-way clutch 56 comprising two internested coaxial hub portions 58 and 60 (FIG. 2). The hub portion 60 is integral with the two-armed lever 46 and axially movable relative to the hub portion 58. A helical spring 62 biases the hubs 58 and 60 against brackets 50 and 52, respectively. The hub portion 58 is provided with an end face having radial teeth therein. These teeth mesh with complementarily shaped teeth in an end face of a collar 64. The collar 64 is preferably an integral part of the bracket 50. The teeth in the hub portion 58 and in the collar 64 are saw teeth configured ordinarily to prevent rotational movement in one direction between the collar 64 and the hub portion 58 and to permit rotation of the hub portion 58 in the opposite direction in the manner of a ratchet. The hub portions 58 and 60 are free under the bias of the spring 62 axially to move back and forth with respect to each other. They are, however, locked against relative rotation by a screw 66 seated in the hub 58 and protruding through an axially extending slot in the hub 60. Thus, when the arm 48 is pushed downwardly the teeth of the hub portion 58 slip by those of the collar 64, and the hub 58 oscillates axially on the pin 54. As the arm 48 moves down the arm 44 pivots upwardly and carries the plate 42 with it. This, in turn, tightens the cable 40 and results in the leg 16 being drawn toward the knuckles 20 until the shoulder 34 of the collar 32 engages the peripheral surface of the knuckles 20. With the leg 16 in the position shown in solid lines in FIG. 1 the engagement between the shoulder 34 and the arcuate portion 26 of the peripheral surface of the knuckles 20 causes the leg 16 to be locked against outward or upward pivotal movement by virtue of the eccentric disposition of the peripheral surface relative to the pintle 24 as described above. Any attempt to move the leg 16 outwardly, either by direct action on the leg 16 or by putting weight upon the tripod 10 at its fixture 14, would lead to an increased clamping of the shoulder 34 against the knuckles 20 because of the increasing radius between the pintle 24 and the peripheral surface. Since all three legs 16 are identically suspended they will securely support the tripod 10. Conversely, if the leg 16 is pivoted in the opposite direction, i.e. inwardly or downwardly, the shoulder 34 slides off the peripheral surface as the radius between the pintle 24 and the surface is decreasing in this direction. This relieves the tension on the cable 40, in preparation for pivoting the leg 16 into its inoperative position, in the manner to be described.

By grasping the arm 48 of the two-armed lever 46, an operator may move the hub portion 60 to the left (FIG. 2) and then tighten the screw 66 to interlock the hubs 58 and 60. By then moving the arm 48 to the right again, hub 58 moves with it, and the teeth disengage. Thus the two-armed lever 46 can be rotated in a counter-clockwise direction (FIG. 1) which lowers the plate 42 and slackens the cables 40. The legs 16 are then free to be pivoted to their storage position adjacent and parallel to the pedestal 12 as shown in phantom in FIG. 1. During pivoting the shoulder 34 slides along the peripheral surface of the knuckles 20. Once the legs 16 are in their storage position the screw 66 may be released to return the hub 58 to its engagement with the collar 64 under the bias of the spring 62. Since the cable 40 is initially slackened somewhat by the leg 16 being pivoted inwardly, the strength of engagement between the teeth is reduced to ease the movement of the hub 60 to the left in the described manner.

Figure 4:
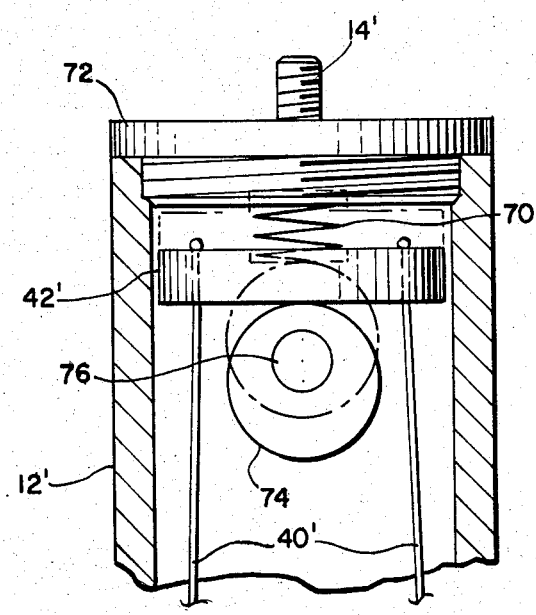
FIG. 4 is a view similar to FIG. 3 rotated 90 degrees.

Another apparatus useful for tightening the cable 40' is depicted in FIGS. 3 and 4. (To the extent this structure possesses elements similar to those described in connection with FIGS. 1 and 2, they are identified by the same reference numerals distinguished by a prime.) The cable 40' is attached to the plate 42' which is mounted for vertical movement within the pedestal 12'. The plate 42' is biased in a downward direction by a helical spring 70. One end of the spring 70 is seated on the upper surface of the plate 42', and the other end engages a capping plate 72 which closes the upper end of the pedestal 12'. The lower surface of the plate 42' rests upon the peripheral surface of a cam disc 74. The cam 74 is fixedly mounted on a shaft 76 journalled within a bearing 78. The bearing 78 may be formed integrally with the pedestal 12'. The end of the shaft 76 opposite the cam 74 protrudes from the bearing 78 on the outside of the pedestal 12' and has affixed to it a knurled knob 80. The knob 80 serves to rotate the shaft 76 and the cam 74 and to prevent axial movement of the shaft 76 into the support member 12', outward movement being prevented by a lock ring 82 attached to the shaft 76 and bearing against an inner wall surface of the pedestal 12'. Preferably, the shaft 76 is provided with means for preventing its rotation by more than half a revolution. Such means may take the form of a pin 84 one end of which is radially protruding from the shaft 76 and positioned in a recess 86 semicircularly circumscribing the shaft 76 within the bearing 78. The ends of the half revolution correspond to the lobe and the dwell, respectively, of the cam 74 and, thus, the high and low position of the plate 42' within the pedestal 12'. As is apparent, the cable 40' is in its tight condition and the leg (not shown in FIGS. 3 and 4) in its secure operative position, when the plate 42' is in its raised position. Conversely, when the plate is in its lower position, resting upon the dwell of the cam 74, the cable 40' is slackened and the leg may be pivoted to its inoperative position, it being understood that the cam 74 is dimensioned to accommodate the length of cable required to permit such movement of the leg.

Figure 7:
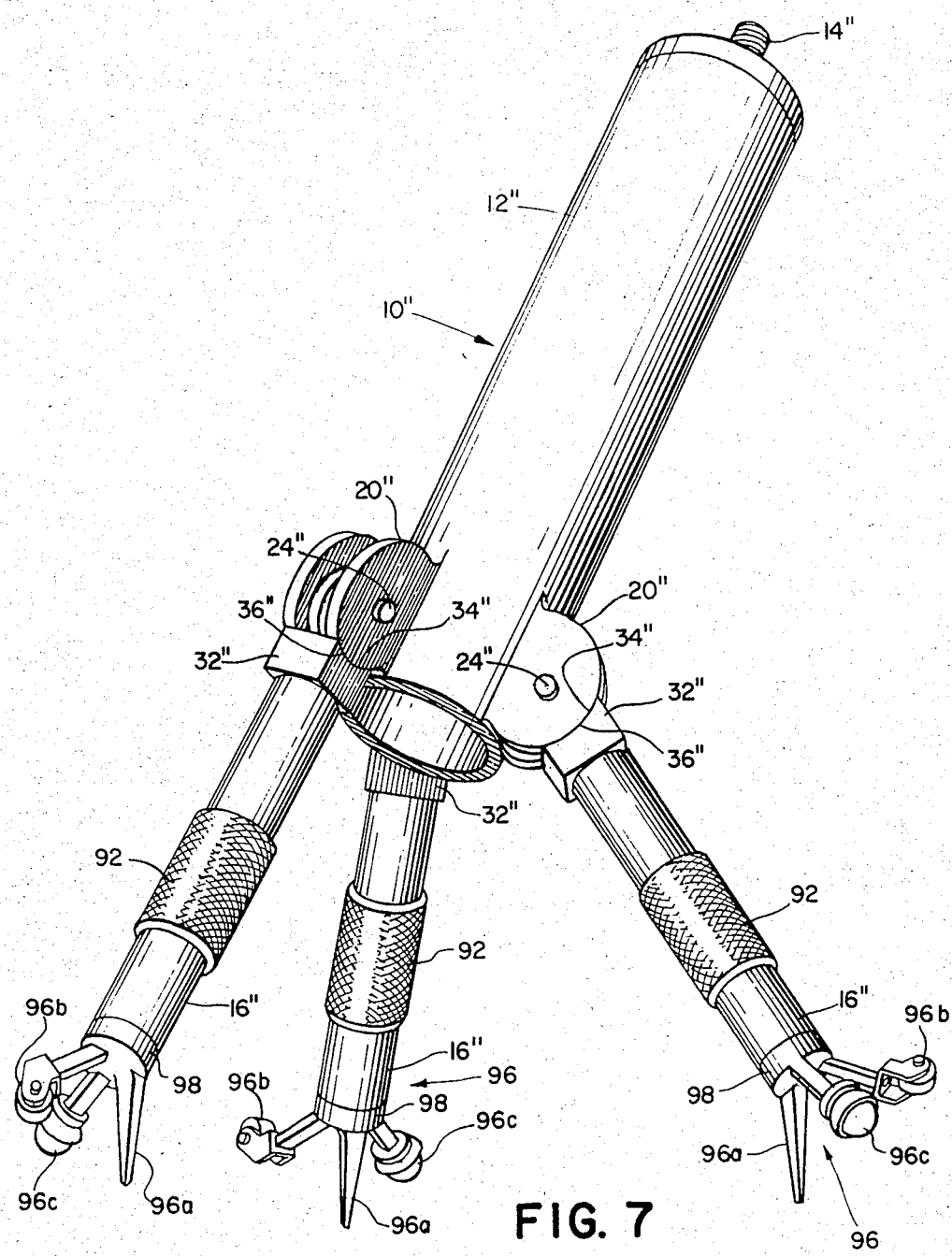
FIG. 7 is a view, in perspective, of the tripod of FIG. 5, showing its suitability as an equatorial mount for a telescope.

An embodiment, of particular advantage in connection with, or being itself an equatorial mount for telescopes, is illustrated in FIGS. 5 and 7. Those elements of this embodiment which are similar to elements described above are identified by the same reference numerals distinguished by a double prime. Here, too, the tripod 10" comprises a pedestal 12" being provided at one end with a fixture 14" for supporting an instrument.

At its opposite end the pedestal 12" is provided with brackets or hinges 18" having knuckles 20", the peripheral surface of which is circularly arcuate. In a manner similar to the embodiment of FIG. 1, each knuckle 20" has eccentrically placed therein a pintle 24" which serves pivotably to support a leg 16" by way of knuckles 22". Since the arrangement is the same for each of the three legs 16" one only will be described.

In this embodiment the leg 16" is provided, at its end adjacent the hinge 18" with a collar 32" having a shoulder 34" shaped to complement the peripheral circular curvature of the knuckles 20". The leg 16" is rotatable relative to the collar 32". In contrast to the previously described embodiment, however, the knuckles 22" are affixed to a threaded shank 88 seated within an axial threaded bore 90 of the leg 16" and extending through a bore in the collar 32". A knurled portion 92 of the outer surface of the leg 16" is provided to assist in rotating the leg 16". By rotating the leg 16" it may be moved radially with respect to the knuckles 20". Moving the leg 16" toward the knuckles 20" causes the shoulder 34" of the collar 32" to engage the peripheral surface of the knuckles 20" to arrest the leg 16" in an operative position as described in connection with the earlier embodiment. Rotation of the leg 16" in the opposite direction releases the shoulder 34" from the peripheral surface so that the leg 16" may be moved to its inoperation position shown in phantom in FIG. 5. As in the prior embodiment, the eccentrically located pintle 24" in conjunction with knuckles 20" and shoulder 34" facilitate the arresting of each leg 16" in an outwardly direction and allow an early release of the legs 16" in an inward direction.

Being individually moveable and positionable, the legs 16" of this embodiment may be disposed at identical angles with respect to the pedestal 12" (FIG. 5), or they may be locked in different angular positions as shown in FIG. 7. Such an arrangement of differently positionable legs 16" is advantageous in that the tripod 10" may be used as an equatorial mount for a telescope, wherein the axis of the pedestal 12" establishes the axis of declination, the polar axis being established by the differently inclined legs 16". Such an arrangement is useful also for mounting an altazimuth.

The tripod in accordance with the invention is provided with feet adapted securely to support the tripod on surfaces of different characteristics. Thus, the feet 94 shown in connection with the tripod 10 of FIG. 5 are of substantially semi-spherical configuration. Preferably, they are fabricated of a polymer possessing a high friction coefficient to prevent sliding of the tripod 10 on a smooth surface.

Another preferred foot 96 shown mounted on the legs 16 of the tripod 10 of FIGS. 1 and 7 and, in more detail in FIGS. 8 and 9, comprises three support members 96a, 96b and 96c. The support members 96a, 96b and 96c are rigidly mounted on and angularly extending from a common head 98. As shown in FIG. 9 the support members 96a, 96b and 96c are spaced equidistantly from each other, i.e. at 120°. If more or fewer support members than three are used, their spacing from each other would be appropriately different.

The support member 96a is a spike useful for supporting the tripod 10" on rough or irregular surfaces. Support member 96b is a castor suited for applications which require moving the tripod over smooth surfaces. The support member 96c is similar in structure to the foot 94 of FIG. 1, i.e. it may be a semispherical body of high friction material.

The head 98 is provided with a shank 100 facing in a direction opposite the support members 96a-c. The shank 100 is seated in an axial bore 102 provided in the leg 16 at its end opposite the hinge 18. It is retained in the bore 102 by a helical spring 104 seated on the shank 100 and tensioned between a lock ring 106 affixed to the end of the shank 100 and a collar 108 seated in the open end of the bore 102. The collar 108 is provided with an axial bore through which the shank 100 is extending, and is provided with an undulating face cam 110 engaged by a complementarily shaped face cam 112 in the face of the head 98 from which the shank 100 is protruding. The undulations in the face cams 110 and 112 correspond to the spacing between the support members 96a–c. Thus, by pulling the foot 96 in the direction away from the leg 16 it may be rotated to bring any one of the support members 96a–c into an operative position. The foot 96 will return to its position in engagement with the face cam 110 upon release, owing to the bias of the spring 104.

The invention as described in its preferred embodiments is believed to be such that it accomplishes the above and other objects. It has been described by way of examples, not be way of limitations. Its scope is to be determined and interpreted by the claims appended hereto.

What is claimed is:

1. An apparatus for supporting an article, comprising:
   an elongated support having a predetermined axis;
   a plurality of legs;
   bracket means including bearing means mounted on said support for mounting each of said legs for pivotal movement between support positions in which said legs extend angularly relative to said axis, and storage positions, and having an axis of rotation extending normal to said predetermined axis, said bracket means each being provided with an arcuate peripheral surface at least partially and eccentrically circumscribing said bearing means, and whereby the spacing between said peripheral surface and said axis of rotation increases radially from a minimum to a maximum;
   abutment means connected with said legs in facing relationship to said peripheral surfaces and radially movable relative thereto for maintaining said legs in their support positions; and
   means for selectively radially moving said abutment means into engagement with said peripheral surfaces for arresting each leg against pivotal movement in the direction of the radially increasing curvature and to provide quick release of each leg for pivotal movement in the opposite direction.

2. The apparatus of claim 1, wherein said means for moving said abutment means comprises a cable.

3. The apparatus of claim 2, wherein the cables extend between a two-armed lever mounted on the pedestal and the legs.

4. The apparatus of claim 3, wherein the two-armed lever is pivotably mounted on the pedestal.

5. The apparatus of claim 4, wherein the two-armed lever comprises a one-way clutch for transmitting movement of the two-armed lever to the leg members to move the abutment means into engagement with the peripheral surfaces and for selectively preventing movement out of engagement.

6. The apparatus of claim 5, wherein the one-way clutch is provided with means for releasing the abutment surface for movement out of engagement with the peripheral surface.

7. The apparatus of claim 3, including means for connecting the cable of each leg member to the two-armed lever.

8. The apparatus of claim 2, wherein said cable extends between said legs and a cam follower cooperatively connected with a rotatable cam.

9. The apparatus of claim 8, wherein said cam comprises an eccentric mounted for rotation by one half revolution and having a null and a lobe positioned on said cam to coincide with the termini of said half revolution.

10. The apparatus of claim 1, wherein the means for moving the abutment means comprises a first member and second member threadedly connected to each other, one member being connected to the bearing means for pivotal movement, the other member being integral with means leg whereby rotation thereof causes movement of the abutment means relative to the peripheral surfaces.

11. The apparatus of claim 1, wherein each leg, at its end opposite said brackets, is provided with a foot mounted for incremental rotation about an axis parallel to said leg and having a plurality of support members spaced for movement into operational positions by said incremental rotation.

12. The apparatus of claim 11, wherein one of the support members is a spike.

13. The apparatus of claim 11, wherein one of the support members is a castor.

14. The apparatus of claim 11, wherein one of the support members is a semi-spherical member comprising a high-friction material.

15. The apparatus of claim 8, wherein said elongated support is of tubular construction and said cam follower is mounted inside said support for movement substantially parallel to said predetermined axis.

16. The apparatus of claim 15 wherein each of said legs is tubular and a said cable is provided inside said support and each said leg.

* * * * *